US010235651B2

(12) United States Patent
Winkle et al.

(10) Patent No.: US 10,235,651 B2
(45) Date of Patent: Mar. 19, 2019

(54) SECURED DELIVERY LOCKER (71) Applicant: Walmart Apollo, LLC, Bentonville, AR (US)

(72) Inventors: David C. Winkle, Bella Vista, AR (US); Robert C. Taylor, Charlotte, NC (US); Todd D. Mattingly, Bentonville, AR (US); Michael D. Atchley, Springdale, AR (US); Robert L. Cantrell, Herndon, VA (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/842,527

(22) Filed: Dec. 14, 2017

(65) Prior Publication Data

US 2018/0174099 A1    Jun. 21, 2018

Related U.S. Application Data (60) Provisional application No. 62/435,440, filed on Dec. 16, 2016.

(51) Int. Cl.
 G06F 7/00    (2006.01)
 G06Q 10/08   (2012.01)
 G07C 9/00    (2006.01)
(52) U.S. Cl.
 CPC ..... *G06Q 10/0836* (2013.01); *G06Q 10/0832* (2013.01); *G07C 9/00896* (2013.01); *G07C 2009/0092* (2013.01)
(58) Field of Classification Search
 None
 See application file for complete search history.

(56) References Cited

U.S. PATENT DOCUMENTS 9,211,025 B1   12/2015   Elhawwashy
9,234,757 B2    1/2016   Skaaksrud
(Continued)

FOREIGN PATENT DOCUMENTS

WO   2015155087   10/2015
WO   2016037219    3/2016

OTHER PUBLICATIONS

Media Wiki; "The Whole Drone Package System Concept"; http://cstwiki.wtb.tue.nl/index.php?title=The_Whole_Drone_Package_System_Concept; Jun. 30, 2016; pp. 1-7.
(Continued)

*Primary Examiner* — Yolanda R Cumbess
(74) *Attorney, Agent, or Firm* — Fitch, Even, Tabin & Flannery (57) ABSTRACT

Apparatuses and methods are provided herein useful for receiving and storing delivered items. In some embodiments, a secured delivery locker is described herein that can communicate with delivery vehicles and/or users. In several embodiments, an autonomous delivery vehicle can communicate with a secured delivery locker to authenticate itself. The secured delivery locker can then grant access to the delivery vehicle, such as by opening a door to an interior thereof, so that the delivery vehicle can deposit a package therein. The locker can then confirm receipt of the package and close the door. Thereafter, the locker and/or the delivery vehicle can update a system to indicate that the package was delivered.

22 Claims, 5 Drawing Sheets

(56) References Cited

U.S. PATENT DOCUMENTS

| | | |
|---|---|---|
| 9,244,147 B1 | 1/2016 | Soundararajan |
| 2005/0035515 A1 | 2/2005 | Hixon |
| 2005/0068478 A1 | 3/2005 | Kuji |
| 2014/0032034 A1 | 1/2014 | Raptopoulos |
| 2015/0120094 A1 | 4/2015 | Kimchi |
| 2015/0186840 A1 | 7/2015 | Torres |
| 2016/0027261 A1 | 1/2016 | Motoyama |
| 2016/0260161 A1* | 9/2016 | Atchley .................... E01H 5/12 |
| 2017/0124547 A1* | 5/2017 | Natarajan .......... G06Q 10/0836 |
| 2018/0068255 A1* | 3/2018 | Hance .................... B65G 57/03 |

OTHER PUBLICATIONS

PCT; App. No. PCT/US2017/066335; International Search Report and Written Opinion dated Feb. 16, 2018.
Varnholt, Hendrik; "DHL's Drone Demonstration Fails to Deliver"; http://www.wsj.com/articles/dhlsdronedemonstrationfailstodeliver1453226792; Jun. 30, 2016; pp. 1-5.

\* cited by examiner

SECURED DELIVERY LOCKER

CROSS-REFERENCE TO RELATED APPLICATION

This application claims the benefit of the following U.S. Provisional Application No. 62/435,440 filed Dec. 16, 2016, which is incorporated herein by reference in its entirety.

TECHNICAL FIELD

This invention relates generally to storage containers and, more specifically, to secured storage containers.

BACKGROUND

Deliveries are commonly made to lockers or other storage containers. Options are now being explored for utilizing unmanned vehicles, such as drones, to deliver packages. When delivering to lockers, however, unmanned vehicles can be faced with circumstances where a delivery cannot be successfully completed. Identification of these circumstances and exception handling can be helpful in the development of satisfactory operation of unmanned delivery vehicles.

BRIEF DESCRIPTION OF THE DRAWINGS

Disclosed herein are embodiments of systems, apparatuses and methods pertaining to secured reception and storage of delivered items. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for receiving and storing delivered items. More specifically, a locker is described herein that is configured to receive and store delivered items in a secure manner. The locker can communicate with delivery vehicles and/or users. Advantageously, such a configuration can be utilized with autonomous vehicles, such as drones or robots, so that the vehicles can communicate with the locker and receive access thereto for deliveries. The locker can also communicate with customers or delivery persons to grant access thereto.

In some embodiments, an autonomous delivery vehicle can communicate with a secured delivery locker to authenticate itself. The locker can then grant access to the delivery vehicle, such as by opening a door to an interior thereof, so that the delivery vehicle can deposit a package therein. The locker can then confirm receipt of the package and close the door. Thereafter, the locker and/or the delivery vehicle can update a system to indicate that the package was delivered. The locker can also notify an owner of the locker that the package was delivered and ready for pick-up and the owner can access the package using an access code or the like.

Pursuant to this, a secured delivery locker 10 is shown in FIGS. 1-5. The delivery locker 10 includes a housing 12 having an interior 14 and a door 16 providing access thereto. The housing 12 can take any suitable shape and size for the intended use and type/size of packages being delivered. The door 16 is movable between open and closed positions, exposing and blocking an opening 18 to the housing interior 14.

Figure 1:
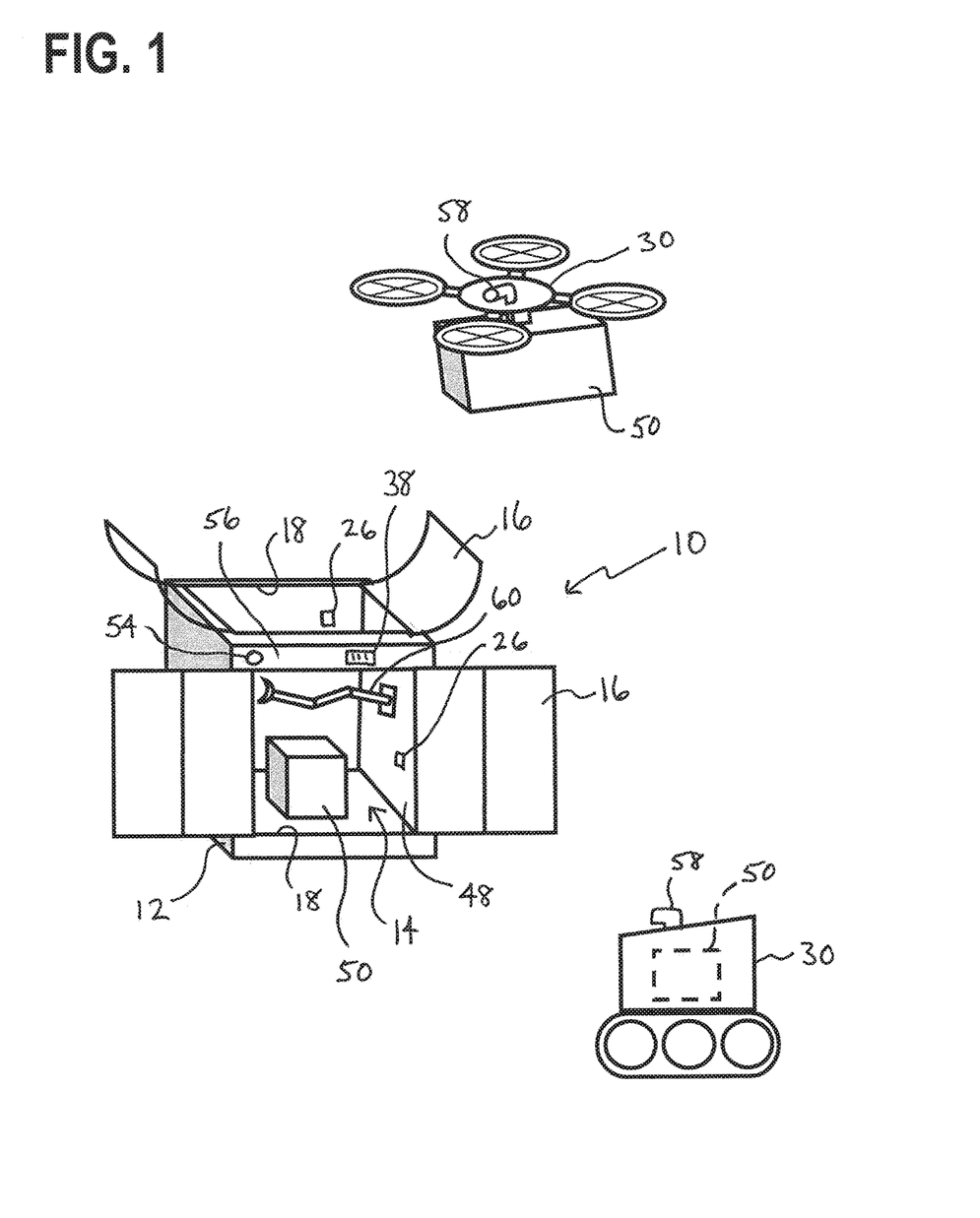
FIG. 1 is a diagrammatic view of a delivery system in accordance with some embodiments.
Figure 3:
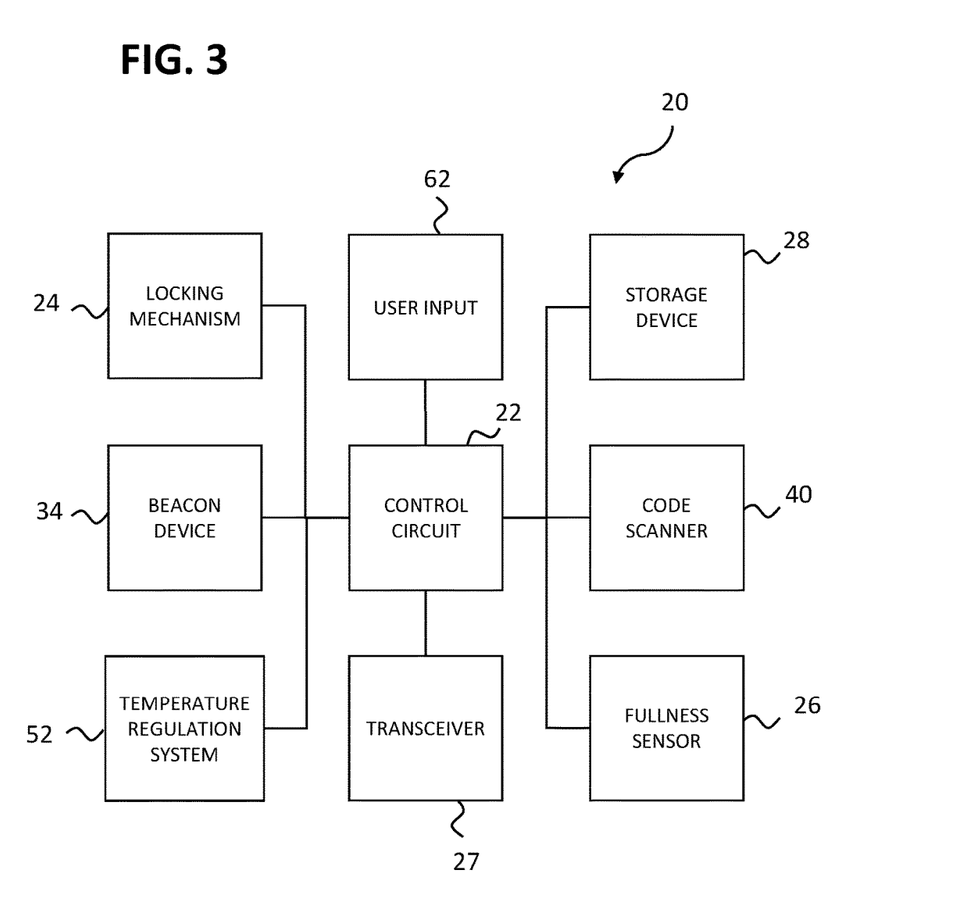
FIG. 3 is a diagrammatic view of an electronic assembly for a delivery locker in accordance with some embodiments.

The locker 10 further includes an electrical assembly 20 including a control circuit 22, a locking mechanism 24 mounted to the door 16 and/or housing 12 that is configured to prevent access to the housing interior 14 to only authorized users, one or more fullness sensors 26 configured to determine a fullness level of the housing interior 14, a transceiver 27, and a storage device 28 to store information thereon as set forth below.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 22 may be configured (for example, by using corresponding programming stored in a memory as will be well understood by those skilled in the art) to carry out one or more of the steps, actions, and/or functions described herein.

Figure 2:
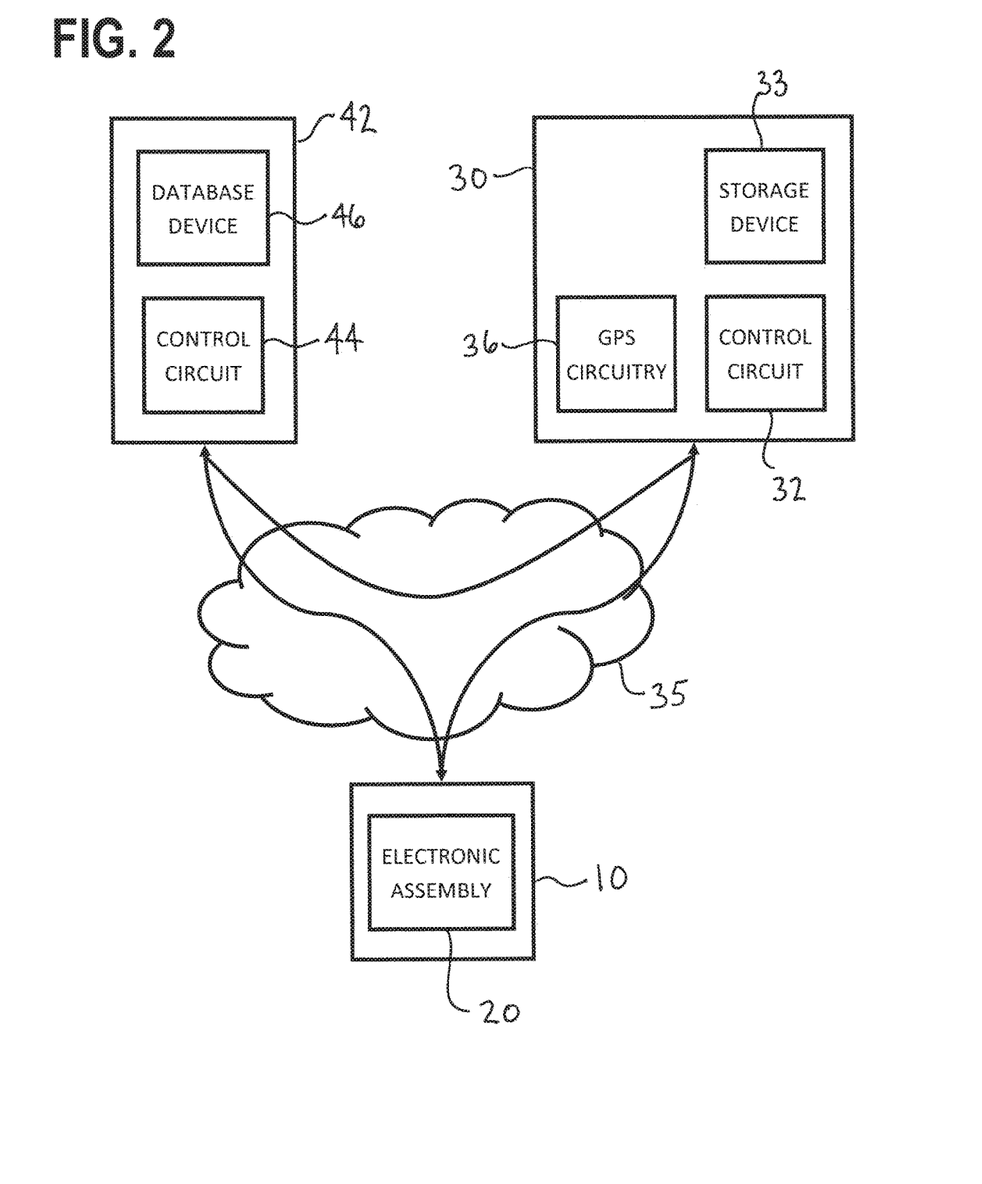
FIG. 2 is a perspective view of a delivery locker and delivery vehicle in accordance with several embodiments.

In some embodiments, the locker 10 can be configured to interact with autonomous delivery vehicles 30, such as drones or robots, to receive deliveries therefrom. The delivery vehicles 30 can include control circuits 32 and associated communication and storage devices 33/circuitry to communicate with the locker 10 to authenticate itself over any suitable communication network 35, such as radio, WiFi, Bluetooth, near field communication, and so forth. If desired, the delivery vehicles 30 can utilize one of several options for locating the locker 10. By a first approach, the locker electronic assembly 20 can further include a beacon device 34 that can be utilized by the delivery vehicles 30 to locate the locker 10. By a second approach, the delivery vehicles 30 can include global positioning system circuitry 36. By a third approach, the locker housing 12 can have markings 38 thereon that can be read and identified by a scanner 40 on the delivery vehicles 30.

By several approaches, a central system 42, which can include a control circuit/server device 44 and database devices 46, can be configured to communicate with the locker 10 and delivery vehicles 30, and provide a central repository for identification and shipment information therefor.

As discussed above and as shown in FIG. 3, the electronic assembly 20 can include one or more sensors 26, which can be distributed in an array or disposed along one or more walls 48 of the interior 14 as desired, that are configured to determine available space within the housing interior 14. As such, the locker 10 can utilize the sensors 26 to determine whether a package 50 is disposed within the interior, the location/position of the package 50, and available space within the interior 14 for subsequent packages 50.

The sensors 26 can further be configured to output signaling that indicates a fullness level of the housing interior 14. By one approach, the sensors 26 can determine the position of any packages 50 in the housing interior 14. For example, the sensor 26 can be an optical sensor, utilizing lasers or the like, can scan the housing interior 14 to determine the location and/or position of any packages 50 therein. By further approaches, the sensors 26 can include a piezoelectric scale, stationary or movable electronic imagers and associated image analysis, including text recognition, scanners to create a point cloud, barcode readers, and so forth. The sensors 26 are in communication with the control circuit 22 so that the control circuit 22 can analyze the readings thereof and determine a fullness level for the housing interior 14.

In some embodiments, the electronic assembly 20 can include additional sensors or components. In a first example, delivered packages 50 can include perishable items that require temperature control. As such, the assembly 20 can include a temperature regulation system 52, including cooling and heating system, if desired. The control circuit 22 can operate the system 52 to maintain a desired temperature in the housing interior 14 conformed to a package 50 therein. By a further approach, the housing 12 can include an indicator 54, such as a light source visible on an exterior 56 thereof, an alarm signal, or the like, to provide an indication that the temperature regulation system 52 is working properly or malfunctioning, as desired. For example, the delivery vehicle 30 can determine whether the system 52 is working by examining the indicator 54 prior to delivering the package 50 using an imager 58 or other scanner mounted thereto.

As shown in FIG. 2, the housing 12 can also include a manipulator 60 configured to move/position packages 50 within the housing interior 14 to better utilize the space therein. For example, if a package 50 is positioned in the middle of the interior 14 or disposed at an angle, the control circuit 22 can analyze readings from the sensors 26 and operate the manipulator 60 to move the package 50 to a more desirable location and/or position to thereby optimize the usage of space. The manipulator 60 can take any suitable form(s), such as an arm having one or more joints, a vibration mechanism, and so forth.

So configured, the locker 10, delivery vehicle 30, and central system 42 can communicate therebetween for delivery of a package 50. For example, the delivery vehicle 30 and the locker 10 can communicate to authenticate the vehicle 30. The vehicle 30 can send an access code or other authentication information to the locker 10 to be verified by the control circuit 22 thereof, such as by comparison to information stored on the storage device 28 or received from the central system 42. If desired, the locker 10 can initiate communications with the delivery vehicle 30 in response to determining that the delivery vehicle 30 is within a predetermined range of the locker 10. The access code can be a one-time code generated for delivery of the package 50 or can be a general code utilized by the vehicle and/or locker. Further, if desired, the locker 10 can be configured to authenticate itself with the delivery vehicle 30 using any of the above methods, to confirm that delivery is being directed to the correct locker 10.

The locker 10 can be configured to reject delivery of the package 50 for a number of reasons. In one example, the locker 10, and specifically the control circuit 22 thereof, can be instructed by an owner of the locker 10 reject all deliveries. In another example, as set forth in more detail below, the locker 10 can lack the space available to receive an additional package. In another example, conditions of the delivery may not be able to be met. In yet another example, the control circuit 22 can determine that the package 50 does not match the item indicated for delivery.

As set forth above, the control circuit 22 can analyze the readings from the sensors 26 to determine the fullness level of the housing 12. By one approach, the control circuit 22 can send an indication of available space to the delivery vehicle 30 and the delivery vehicle 30 can analyze the package dimensions to determine if the package 50 can fit in the available space. Thereafter, the delivery vehicle 30 can either send a confirmation signal to the locker 10 or can start exception handling decision tree, set forth in more detail below. By another approach, the control circuit 22 can compare the available space to product information received from the delivery vehicle 30 and/or the central system 42. Thereafter, the control circuit 22 can either send a confirmation of sufficient space message back to the delivery vehicle 30 and/or central system 42 or can send an insufficient space message thereto. By a further approach, the control circuit 22 can monitor the available space using the sensors 26 and send updated status messages to the central system 42 so that subsequent deliveries can be analyzed prior to being commenced.

After the delivery vehicle 30 and/or locker 10 has been authenticated and space availability has been confirmed, the control circuit 22 of the locker 10 can unlock the locking mechanism 24 for delivery. The control circuit 22 can further cause the door 16 to open, moving the door 16 from the closed position to the open position. By one approach, the door 16 can include two portions that each open on opposite sides of the opening 18, similar to bay doors. If desired, the control circuit 22 can open the door 16 in response to receiving the access code or can open the door 16 in response to a separate signal transmitted from the delivery vehicle 30. As shown in FIG. 1, the opening 18 can be provided through a top 50 of the locker 10 to provide easy access for drones or the like. By another or further approach, the opening 18 can be provided in a side 52 of the locker 10 for ground vehicles.

By an alternative, or back-up, approach, the delivery vehicle 30 can utilize the imager 58 mounted thereto analyze the available space in the housing interior 14 by capturing images and/or video of the interior 14 through the opening 18 and analyzing the images with the control circuit 32 thereof.

After the door 16 is opened, the delivery vehicle 30 can then deposit the package 50 in the locker interior 14. Thereafter, the locker 10 can confirm that the package 50 has been delivered. In a first approach, the sensor 26 can send a signal to the control circuit 22 in response to sensing the package 50, as set forth in more detail below. In a second or further approach, the delivery vehicle 30 can transmit a signal to the locker 10 to confirm delivery of the package 50. The locker 10 and/or delivery vehicle 30 can further transmit a signal to the central system 42 confirming delivery. Thereafter, the control circuit 22 can cause the door 16 to close, securing the package 50 within the locker interior 14.

If desired, the electronic assembly 20 can validate that the delivered package 50 is correct. More specifically, the control circuit 22 can confirm via communications with the delivery vehicle 30 and/or central system 42 to confirm that expected delivery information matches the actual delivery information.

For example, the control circuit 22 can analyze information regarding the package 50, which can be received from the delivery vehicle 30 or the central system 42, and compare sensor readings to the information. By one approach, the sensors 26 can include a barcode reader and the control circuit 22 can analyze the barcode reading. By another approach, the information can include dimensions for the intended package 50, which the control circuit 22 can compare to dimensions of the delivered package 50 determined by the sensors 26. By further approaches, the control circuit 22 can communicate with the delivery vehicle 30 and/or central system 42 to confirm delivery information, such as delivery location, delivery time, temperature requirements for the delivery, and so forth.

After delivery of the package 50, the central system 42 and/or control circuit 22 can proceed with transaction reconciliation, which can include securing payment for the package 50 by any suitable methods. Finally, the system 42 can be updated to finalize the transaction.

As discussed above, however, in certain circumstances, the delivery is rejected. In these situations, the delivery vehicle and/or central system 42 can determine a next step according to exception handling rules. The rules can be subject to or incorporate customer settings. For example, the exception handling can determine that the next step is returning the package 50, deliver the package 50 to a different location, which can be set by the customer, delivered at a later time, exchanged for an item in the locker 10, and so forth. By one approach, alternative delivery locations can be stored at the locker 10, which can then send an alternative location to the delivery vehicle 30 when a delivery is refused. Optional delivery locations can include at a retail location, at a neighbor, friend, or family house, another secured locker, and the like. The customer can also determine a priority for delivered items. The customer settings can be preset and stored at the locker, central system 42, and/or delivery vehicle 30.

As discussed above, the locker 10 can be associated with a customer. By a first approach, the locker 10 can be owned and used by a single customer. By a second approach, the locker 10 can be a shared locker servicing several customers. In either circumstance, the control circuit 22 of the locker 10 can utilize the transceiver 27 thereof to send notification messages to the customer. Notification messages can include a message that the package 50 was delivered, a message that the locker 10 is full, or a message that a delivery was rejected, which can include reasons for rejection, for example.

Authorized customers can retrieve the package 50 by any suitable secure method. For example, the electronic assembly 20 can include a user input 62 that the customer can use to enter an access code or information. For example, the user input 62 can be a keypad, biometric reader/scanner, or can utilize the transceiver 27 to receive an access code, such as from a smart device of the user. In one approach, the customer smart device can run a dedicated application configured to transmit an access code to the locker 10.

In some embodiments, a delivery locker is described herein that includes a housing having an interior; a door of the housing configured to be moved between open and closed positions; a sensor mounted to the housing and configured to output signaling corresponding to a fullness level of the interior of the housing; a transceiver; and a control circuit in communication with the sensor and the transceiver. The control circuit is configured to: determine the fullness level of the interior of the housing based at least on the signaling from the sensor; and communicate via the transceiver with a delivery vehicle to notify the delivery vehicle whether a package being delivered by the delivery vehicle can fit within the housing interior.

By several approaches, the control circuit can be configured to send a message to an owner of the delivery locker to notify the owner that the housing cannot receive the package. By other approaches, the control circuit can be configured to send a message to an owner of the delivery locker to notify the owner that the package was delivered.

By some approaches, the control circuit can be configured to move the door to the open position in response to receiving a signal from the delivery vehicle.

By several approaches, the sensor can be configured to determine a position of one or more packages within the interior of the housing. By further approaches, the delivery locker can include a manipulator mounted to the housing and configured to position packages within the interior of the housing to maximize available space.

By some approaches, the control circuit can be configured to analyze media captured by a camera device mounted to the delivery vehicle, along with a reading from the sensor, to determine the fullness level.

By several approaches, the control circuit, in response to determining that the package cannot fit within the interior of the housing, can be configured to determine a next location to send the package and send a message to the delivery vehicle indicating the next location.

Figure 4:
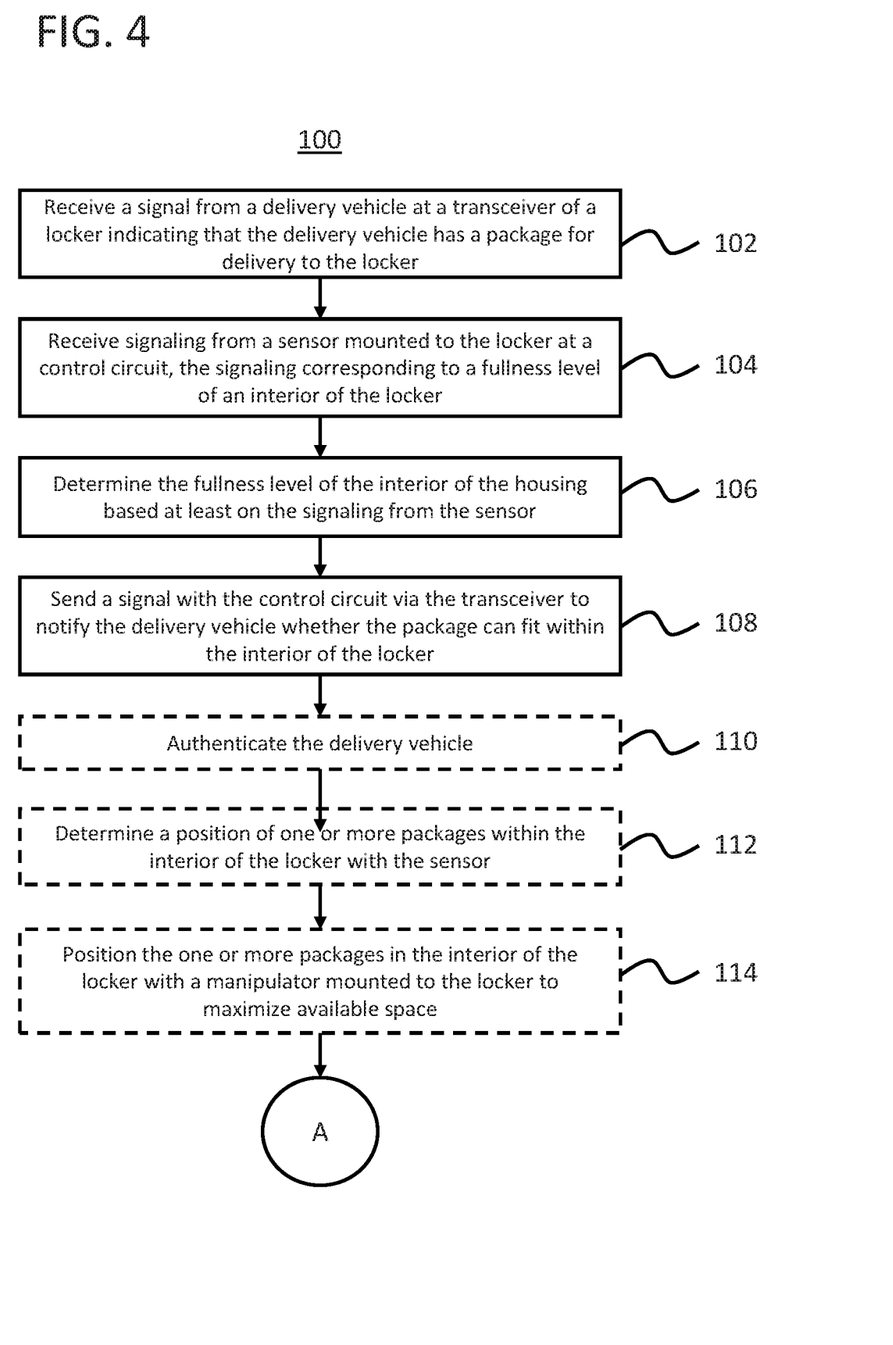
FIG. 4 is a flowchart in accordance with several embodiments.
Figure 5:
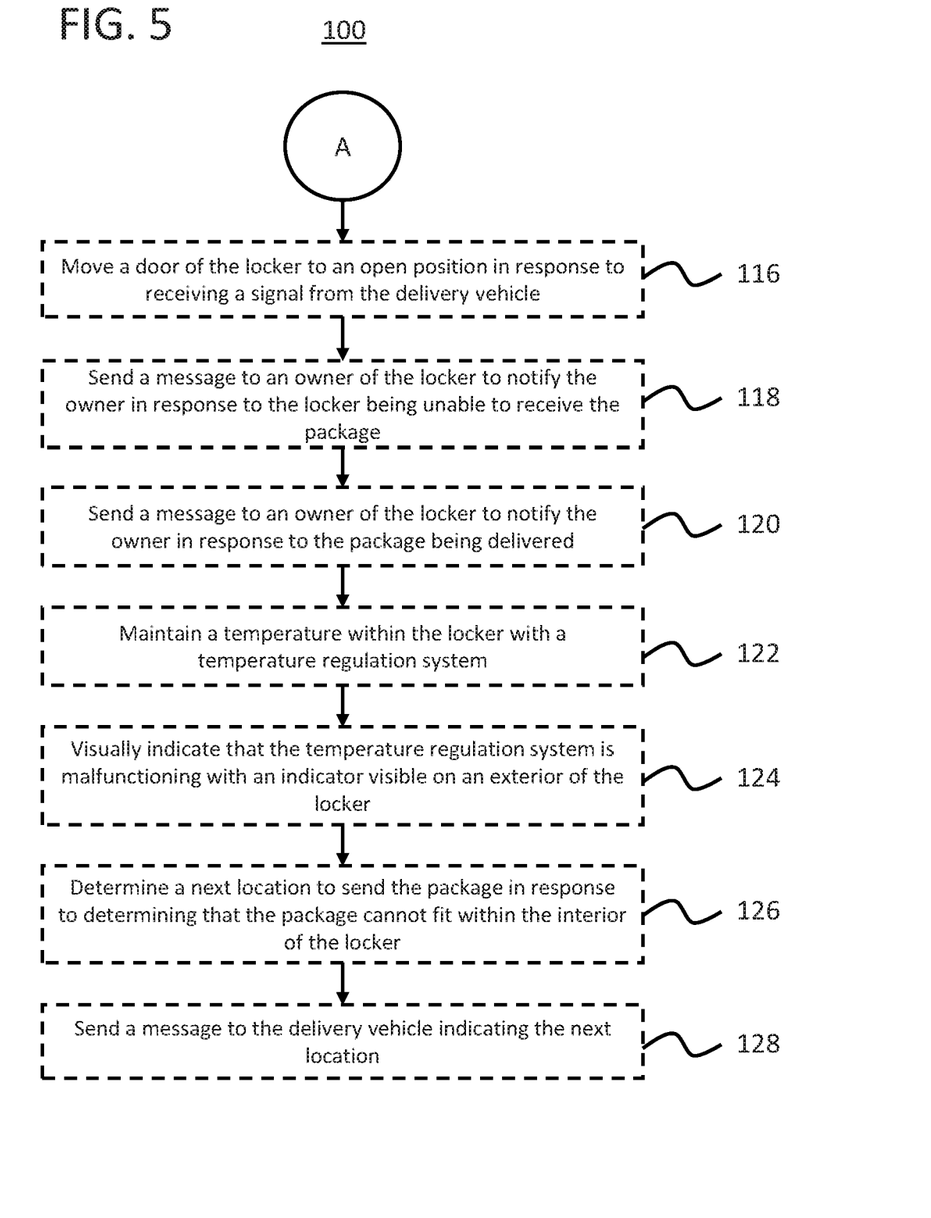
FIG. 5 is a flowchart in accordance with some embodiments.

In some embodiments and as shown in FIGS. 4 and 5, a method 100 for receiving a package delivery at a locker is described herein that includes: receiving 102 a signal from a delivery vehicle at a transceiver of the locker indicating that the delivery vehicle has a package for delivery to the locker; receiving 104 signaling from a sensor mounted to the locker at a control circuit, the signaling corresponding to a fullness level of an interior the locker; determining 106 the fullness level of the interior of the housing based at least on the signaling from the sensor; and sending 108 a signal with the control circuit via the transceiver to notify the delivery vehicle whether the package can fit within the interior of the locker.

By some approaches, the method 100 can further include authenticating 110 the delivery vehicle with the control circuit.

By several approaches, the method 100 can further include sending 118 a message to an owner of the locker with the transceiver to notify the owner that the locker cannot receive the package. By other approaches, the method 100 can further include sending 120 a message to an owner of the locker with the transceiver to notify the owner that the package was delivered.

By some approaches, the method 100 can further include moving 116 a door of the locker to an open position with the control circuit in response to receiving a signal from the delivery vehicle.

By several approaches, the method 100 can further include determining 112 a position of one or more packages within the interior of the locker with the sensor. By further approaches, the method 100 can include positioning 114 the one or more packages in the interior of the locker with a manipulator mounted to the locker to increase/maximize available space.

By some approaches, the method 100 can further include maintaining 122 a temperature within the locker with a temperature regulation system.

By several approaches, the method 100 can further include visually indicating 124 that the temperature regulation system is malfunctioning with an indicator visible on an exterior of the locker.

By some approaches, the method can further include receiving media from the delivery vehicle captured by a camera device thereof; and analyzing the media with the control circuit to determine the fullness level.

By several approaches, the method 100 can further include determining 126 a next location to send the package with the control circuit in response to determining that the package cannot fit within the interior of the locker; and sending 128 a message to the delivery vehicle indicating the next location.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A delivery locker comprising:
   a housing having an interior;
   a door of the housing configured to be moved between open and closed positions;
   a sensor mounted to the housing and configured to output signaling corresponding to a fullness level of the interior of the housing;
   a transceiver;
   a manipulator mounted to the housing and configured to position packages in the housing;
   a control circuit in communication with the sensor and the transceiver, wherein the control circuit is configured to:
      determine the fullness level of the interior of the housing based at least on the signaling from the sensor;
      cause the manipulator to position packages within the interior of the housing to increase the available space; and
      communicate via the transceiver with a delivery vehicle to notify the delivery vehicle whether a package being delivered by the delivery vehicle can fit within the housing interior.

2. The delivery locker of claim 1, wherein the control circuit is configured to authenticate the delivery vehicle.

3. The delivery locker of claim 1, wherein the control circuit is configured to send a message to an owner of the delivery locker to notify the owner that the housing cannot receive the package.

4. The delivery locker of claim 1, wherein the control circuit is configured to send a message to an owner of the delivery locker to notify the owner that the package was delivered.

5. The delivery locker of claim 1, wherein the control circuit is configured to move the door to the open position in response to receiving a signal from the delivery vehicle.

6. The delivery locker of claim 1, wherein the sensor is configured to determine a position of one or more packages within the interior of the housing.

7. The delivery locker of claim 1, wherein the manipulator comprises an arm having one or more joints and/or a vibration mechanism.

8. The delivery locker of claim 1, further comprising a temperature regulation system configured to maintain a temperature within the interior of the housing.

9. The delivery locker of claim 8, further comprising an indicator visible on an exterior of the housing configured to provide a visual indication to the delivery vehicle that the temperature regulation system is malfunctioning.

10. The delivery locker of claim 1, wherein the control circuit is configured to analyze media captured by a camera device mounted to the delivery vehicle, along with a reading from the sensor, to determine the fullness level.

11. The delivery locker of claim 1, wherein the control circuit, in response to determining that the package cannot fit within the interior of the housing, is configured to determine a next location to send the package and send a message to the delivery vehicle indicating the next location.

12. A method for receiving a package delivery at a locker, the method comprising:
   receiving a signal from a delivery vehicle at a transceiver of the locker indicating that the delivery vehicle has a package for delivery to the locker;
   receiving signaling from a sensor mounted to the locker at a control circuit, the signaling corresponding to a fullness level of an interior of the locker;
   determining the fullness level of the interior of the housing based at least on the signaling from the sensor;
   positioning the one or more packages in the interior of the locker with a manipulator mounted to the locker to maximize available space; and
   sending a signal with the control circuit via the transceiver to notify the delivery vehicle whether the package can fit within the interior of the locker.

13. The method of claim 12, further comprising authenticating the delivery vehicle with the control circuit.

14. The method of claim 12, further comprising sending a message to an owner of the locker with the transceiver to notify the owner that the locker cannot receive the package.

15. The method of claim 12, further comprising sending a message to an owner of the locker with the transceiver to notify the owner that the package was delivered.

16. The method of claim 12, further comprising moving a door of the locker to an open position with the control circuit in response to receiving a signal from the delivery vehicle.

17. The method of claim 12, further comprising determining a position of one or more packages within the interior of the locker with the sensor.

18. The method of claim 12, wherein the manipulator comprises an arm having one or more joints and/or a vibration mechanism.

19. The method of claim 12, further comprising maintaining a temperature within the locker with a temperature regulation system.

20. The method of claim 19, further comprising visually indicating that the temperature regulation system is malfunctioning with an indicator visible on an exterior of the locker.

21. The method of claim 12, further comprising:
   receiving media from the delivery vehicle captured by a camera device thereof; and analyzing the media with the control circuit to determine the fullness level.

22. The method of claim 12, further comprising:

determining a next location to send the package with the control circuit in response to determining that the package cannot fit within the interior of the locker; and sending a message to the delivery vehicle indicating the next location.

* * * * *